United States Patent
Buschman

(10) Patent No.: US 7,382,278 B2
(45) Date of Patent: Jun. 3, 2008

(54) PARKED VEHICLE LOCATION SYSTEM

(76) Inventor: Steven Buschman, 22 Blackburnian Rd., Lincoln, MA (US) 01773

( * ) Notice: Subject to any disclaimer, the term of this patent is extended or adjusted under 35 U.S.C. 154(b) by 196 days.

(21) Appl. No.: 11/253,796

(22) Filed: Oct. 20, 2005

(65) Prior Publication Data

US 2007/0090971 A1    Apr. 26, 2007

(51) Int. Cl.
G08G 1/01 (2006.01)
G08G 1/14 (2006.01)
B60Q 1/48 (2006.01)

(52) U.S. Cl. .............. 340/933; 340/932.2; 705/13; 705/418

(58) Field of Classification Search ............... 340/933, 340/932.2
See application file for complete search history.

(56) References Cited

U.S. PATENT DOCUMENTS

| | | | | |
|---|---|---|---|---|
| 5,091,727 A | * | 2/1992 | Mahmood | 340/932.2 |
| 5,910,782 A | * | 6/1999 | Schmitt et al. | 340/995.12 |
| 6,340,935 B1 | * | 1/2002 | Hall | 340/932.2 |
| 6,885,311 B2 | * | 4/2005 | Howard et al. | 340/932.2 |
| 6,885,312 B1 | * | 4/2005 | Kirkpatrick | 340/932.2 |
| 6,927,700 B1 | * | 8/2005 | Quinn | 340/932.2 |
| 7,135,991 B2 | * | 11/2006 | Slemmer et al. | 340/932.2 |

* cited by examiner

*Primary Examiner*—Donnie L. Crosland
(74) *Attorney, Agent, or Firm*—Alpha Patent Associates Ltd.; Daniel J. Swirsky

(57) ABSTRACT

A parked vehicle location system including a plurality of detectors, where each detector is operative to detect whether or not a vehicle is present in at least one of a plurality of parking spaces, and provide a notification characterizing the detection, and parking status apparatus operative to receive a plurality of the notifications from the detectors, record the notifications in a data store, and identify any of the parking spaces for which a notification was received indicating the presence of a vehicle and for which no subsequent notification was received indicating the absence of a vehicle.

9 Claims, 2 Drawing Sheets

PARKED VEHICLE LOCATION SYSTEM

FIELD OF THE INVENTION

The present invention relates to parking management systems in general, and more particularly to parked vehicle location systems.

BACKGROUND OF THE INVENTION

Driver drives car to parking lot. Driver parks car. Driver leaves car. Driver goes about business. Driver returns to parking lot. Driver has no idea where he parked his car. Driver is up a creek without a paddle. Poor driver.

SUMMARY OF THE INVENTION

The present invention discloses a system and method for locating a parked vehicle in a parking garage or lot.

In one aspect of the present invention a parked vehicle location system is provided including a plurality of detectors, where each detector is operative to detect whether or not a vehicle is present in at least one of a plurality of parking spaces, and provide a notification characterizing the detection, and parking status apparatus operative to receive a plurality of the notifications from the detectors, record the notifications in a data store, and identify any of the parking spaces for which a notification was received indicating the presence of a vehicle and for which no subsequent notification was received indicating the absence of a vehicle.

In another aspect of the present invention the parking status apparatus is operative to perform the identification for any of the parking spaces for which the presence notification indicates a detection that occurred within a designated time period.

In another aspect of the present invention the parking status apparatus is operative to perform the identification for any of the parking spaces for which the presence notification indicates a detection that occurred within a designated area.

In another aspect of the present invention the notification includes an identification of the parking space.

In another aspect of the present invention the notification includes either of the time and the date of the detection.

In another aspect of the present invention the parking status apparatus is operative to record a received notification together with either of the time and the date of the receipt of the notification.

In another aspect of the present invention a method is provided for locating parked vehicles, the method including detecting whether or not a vehicle is present in at least one of a plurality of parking spaces, and identifying any of the parking spaces for which a detection was made indicating the presence of a vehicle and for which no subsequent detection was made indicating the absence of a vehicle.

In another aspect of the present invention the identifying step is performed for the detections that occurred within a designated time period.

In another aspect of the present invention the identifying step is performed for the detections that occurred within a designated area.

In another aspect of the present invention the detecting step includes recording an identification of the parking space.

In another aspect of the present invention the detecting step includes recording either of the time and the date of the detection.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
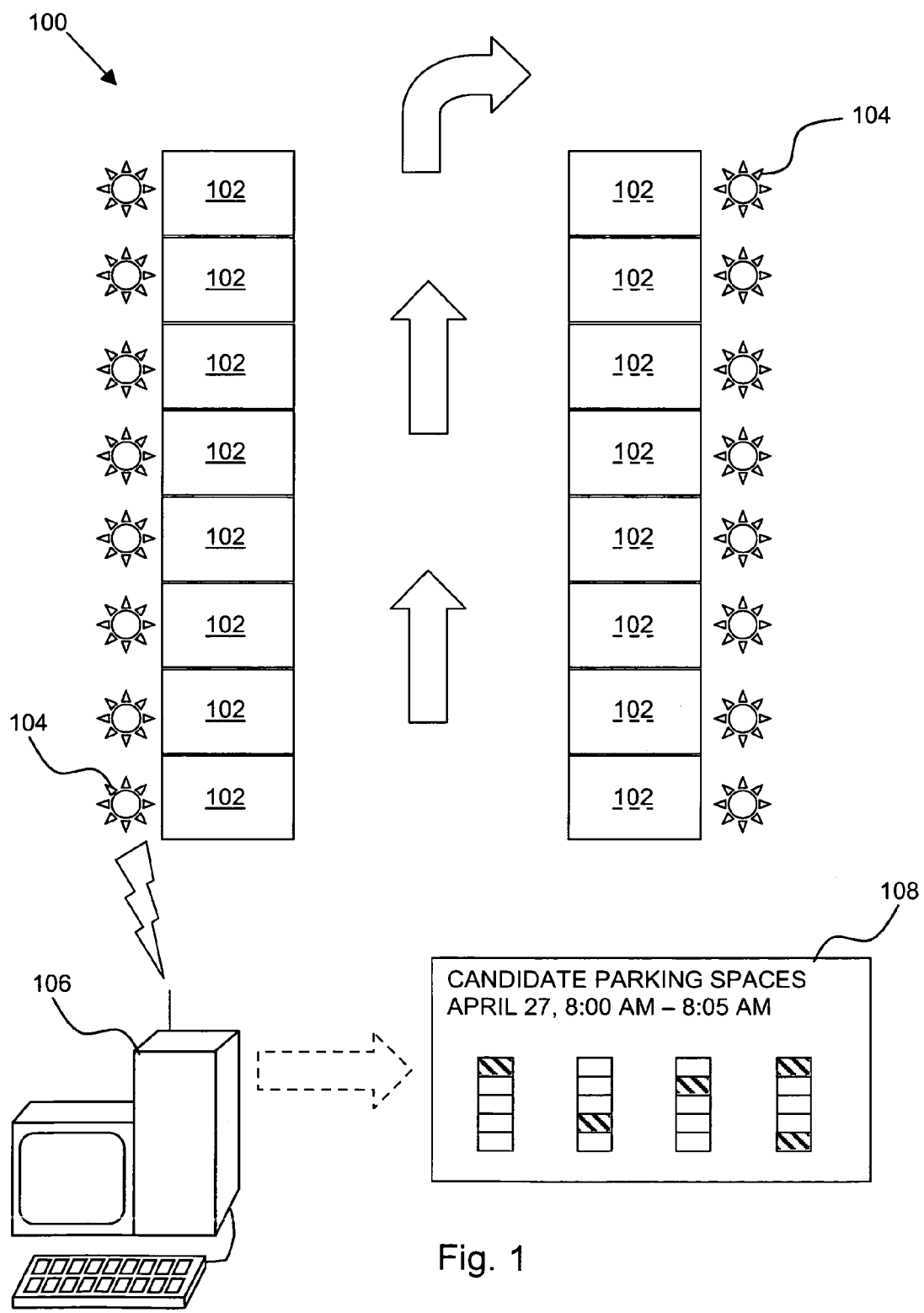
FIG. 1 is a simplified conceptual illustration of a parked vehicle location system, constructed and operative in accordance with a preferred embodiment of the present invention.
Figure 2:
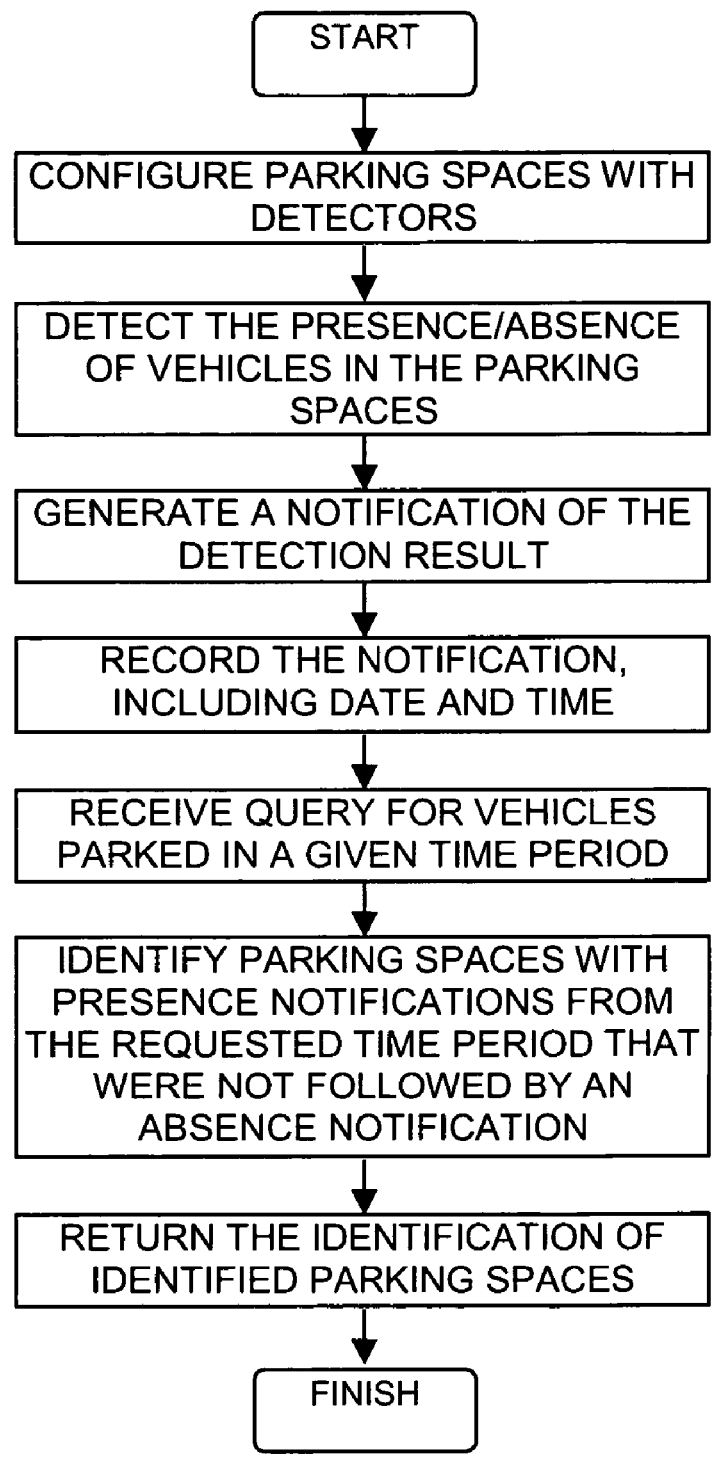
FIG. 2 is a simplified flowchart illustration of an exemplary implementation of the system of FIG. 1, operative in accordance with a preferred embodiment of the present invention.

Reference is now made to FIG. 1, which is a simplified conceptual illustration of a parked vehicle location system, constructed and operative in accordance with a preferred embodiment of the present invention, and additionally to FIG. 2, which is a simplified flowchart illustration of an exemplary implementation of the system of FIG. 1, operative in accordance with a preferred embodiment of the present invention. In the system of FIG. 1 and method of FIG. 2, a parking area 100 is shown having multiple parking spaces 102. For the sake of simplicity and for illustration purposes only, parking area 100 is shown with relatively few parking spaces 102, although it will be appreciated that the present invention may be implemented in—and, indeed, may be most beneficial for—large parking systems, such as where parking area 100 exists as an indoor or outdoor parking lot, parking garage, or multi-lot/garage parking complex, such as in an airport or stadium, having thousands or tens of thousands of parking spaces. One or more detectors 104 are provided for detecting the presence or absence of a vehicle in any of parking spaces 102 using conventional techniques, such as motion detection or proximity detection. Each of parking spaces 102 may have its own detector 104, or, alternatively, multiple parking spaces 102 may share a single detector 104. Each detector 104 generates a notification characterizing the nature of the detection by indicating whether a vehicle was detected within a parking space or not, and transmits the notification, together with a predefined parking space identification, to a parking status apparatus 106, using wired or wireless transmission techniques. Parking status apparatus 106 may be implemented as a personal computer, and records received notifications in a data store, such as in memory, on magnetic media, or any known storage medium. The notification also preferably includes the date and/or time of the detection. Alternatively, parking status apparatus 106 may provide the date and/or time of the receipt of the notification when recording the notification.

Parking status apparatus 106 may be queried regarding any recorded notifications, and particularly to identify any parking spaces for which a notification was received during a give time period and/or for a given designated area indicating the presence of a vehicle and for which no subsequent notification was received indicating the absence of a vehicle. Such notifications indicate vehicles that have not left their parking space from the time they parked and until the time of the query. Parking status apparatus 106 preferably returns the parking space identification of such notifications, where the identified parking spaces may be marked on a map 108 of parking area 100.

The present invention may be further illustrated by way of example, where a driver A enters a parking facility equipped as described hereinabove at 8:00 AM on Monday, April 27. At 8:03 AM driver A parks his vehicle in a parking space. Detector 104 detects the presence of the parked vehicle in the parking space, generates a notification indicating the parking space ID as preconfigured with detector 104, a time stamp of 8:03 AM April 27, and an indicator indicating that the parking space is occupied, and transmits the notification to parking status apparatus 106 where the notification is recorded. Likewise, between 8:00 AM and 8:05 AM 200 other drivers also parked their vehicles in the parking facility for which similar notification were generated and transmitted to parking status apparatus 106 where they were recorded. Five days later, on Friday, May 2, driver A returns to the parking facility, but has forgotten where he parked his vehicle. In an attempt to locate driver A's vehicle, parking status apparatus 106 is queried for parking notifications received on April 27 between 8:00 AM and 8:05 AM, since driver A's parking ticket indicates that he entered the facility at 8:00 AM, and driver A indicates that it took him less than five minutes to find a parking space. Since many of the 200 vehicles that parked around the same time may have already left the facility, as evidenced by subsequent "parking space is empty" notifications received by parking status apparatus 106 for each of the 200 vehicles that left the facility, parking status apparatus 106 is able to narrow the search set. The search may be narrowed still further if the driver is able to recall the lot in which he parked, the floor, and/or the row. The query produces ten candidate parking spaces in which cars that parked on April 27 between 8:00 AM and 8:05 AM still remain. Parking status apparatus 106 then provides their locations to driver A, such as in the form of a map of the parking facility on which the candidate parking spaces are clearly marked. Driver A is then able to check each of the spaces until he finds his vehicle.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A parked vehicle location system comprising:
   a plurality of detectors, wherein each detector is operative to:
   detect whether or not a vehicle is present in at least one of a plurality of parking spaces, and
   provide a notification characterizing said detection; and
   parking status apparatus operative to:
   receive a plurality of said notifications from said detectors,
   record said notifications in a data store, and
   identify, responsive to a query generally indicating a parking time, any of said parking spaces for which any of said notifications was received during said parking time indicating the presence of a vehicle in said parking space and for which no subsequent one of said notifications was received indicating the absence of a vehicle from said parking space.

2. A system according to claim 1 wherein said parking status apparatus is operative to perform said identification for any of said parking spaces for which said presence notification indicates a detection that occurred within a designated area.

3. A system according to claim 1 wherein said notification includes an identification of said parking space.

4. A system according to claim 1 wherein said notification includes either of the time and the date of said detection.

5. A system according to claim 1 wherein said parking status apparatus is operative to record a received notification together with either of the time and the date of the receipt of said notification.

6. A method for locating parked vehicles, the method comprising:
   receiving a plurality of notifications from a plurality of detectors indicating whether or not a vehicle is present in a plurality of parking spaces;
   recording said notifications in a data store; and
   identifying, responsive to a query generally indicating a parking time, any of said parking spaces for which any of said notifications was received indicating the presence of a vehicle during said parking time and for which no subsequent one of said notifications was received indicating the absence of a vehicle from said parking space.

7. A method according to claim 6 wherein said identifying step is performed for said detections that occurred within a designated area.

8. A method according to claim 6 wherein said detecting step comprises recording an identification of said parking space.

9. A method according to claim 6 wherein said detecting step comprises recording either of the time and the date of said detection.

* * * * *